May 11, 1937.  L. G. HAUK  2,079,802

GRAIN WEIGHING APPARATUS

Filed April 27, 1936  2 Sheets-Sheet 1

INVENTOR
LEO G. HAUK
BY
ATTORNEYS

May 11, 1937.  L. G. HAUK  2,079,802

GRAIN WEIGHING APPARATUS

Filed April 27, 1936   2 Sheets-Sheet 2

INVENTOR
LEO G. HAUK
BY
ATTORNEYS

Patented May 11, 1937

2,079,802

UNITED STATES PATENT OFFICE 2,079,802

GRAIN WEIGHING APPARATUS

Leo G. Hauk, Minneapolis, Minn.

Application April 27, 1936, Serial No. 76,626

5 Claims. (Cl. 249—1)

This invention relates to improvements in weighing devices for grain elevators, the main objects being to reduce to the minimum the dissemination of grain dust from the weighing hopper and thus correspondingly reduce fire and health hazards, and to prevent inaccurate weighing, due to improper relief of pressures resultant from displacement of air by grain.

When grain flows from a supply garner into the weighing hopper, a displacement of air in the hopper occurs, due to entry of the grain and the result is puffing and dissemination of grain dust to the outside of the hopper. Moreover, if the pressure is not properly relieved, in accurate weighing results. It has heretofore been the practice to provide for the relief of this pressure by means of a gravity-operated flap valve which could only be operated when the displacement pressure of the air was sufficient to open it. In cases where the operator failed to manipulate the supply or delivery valve in the proper manner (generally failing to sufficiently open the valve), the pressure created was insufficient to open the flap valve, but sufficient to cause a substantial dissemination of grain dust from the weighing hopper, and to give an overweight reading on the scale.

The present invention avoids the use of the old inefficient flap valve operation and provides a pressure relief valve and connections by which it is positively operated in unison with the delivery valve so that it unfailingly opens whatever the degree of delivery valve opening, thus unfailingly obtaining proper pressure relief.

Features of the invention include all details of construction and arrangement by which the relief valve is operated in unison with the supply valve or valves and in which the relief valve is opened in a degree proportionate to the opening of the supply valve for the purpose set forth, along with the broader ideas of means inherent in the disclosure.

Objects, features and advantages of the invention will be set forth in the description of the drawings forming a part of this application, and in said drawings Figure 1 represents somewhat diagrammatically the parts necessary to the illustration of this invention, the weighing beams and connections between the beams and weighing hopper being omitted;

Figure 1:
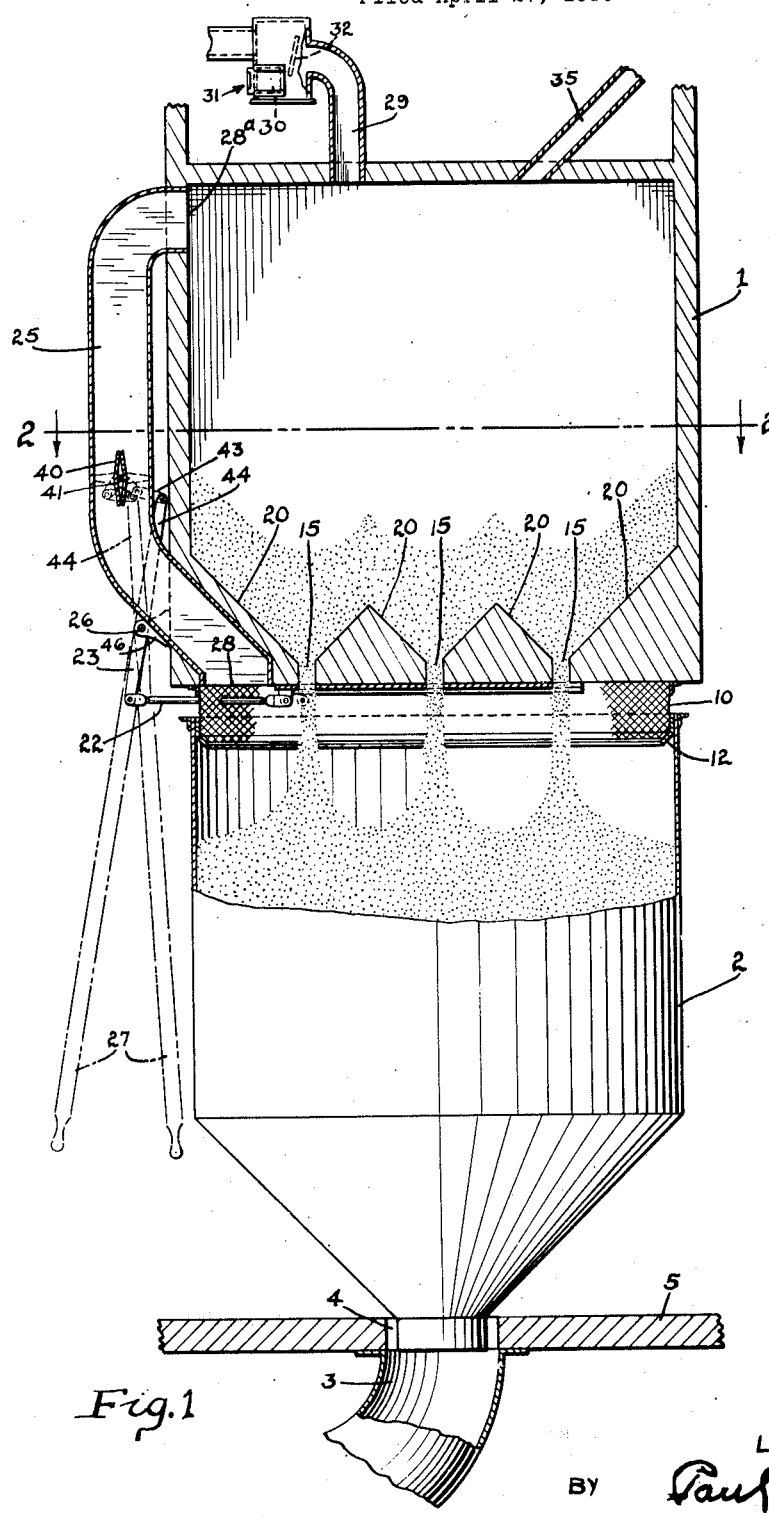

Numeral 1 indicates a concrete garner, numeral 2 indicates a steel hopper which is connected with or forms a part of the weighing apparatus and which is adapted to receive the grain to be weighed. The lower end of the steel hopper leads into a suitable conduit 3 through an opening 4 in the floor 5. The valve for controlling delivery of the grain after weighing is not shown inasmuch as it forms no part of the present invention.

To prevent free dissemination of grain or grain dust during transfer from garner to hopper, a fabric curtain 10 is hung from the bottom of the garner and projects downwardly into the upper part of the weighing hopper in a manner not to interfere with accurate weighing, but to provide as good a seal as possible. However, this seal does not prevent dissemination of dust if the proper relief for the displaced air is not provided for. The lower part of the apron 10 generally lies loosely against an interiorly disposed circumferential inwardly and downwardly slanted flange 12. The length of the apron is, of course, sufficient to properly allow down movement of the steel hopper as it is filled, and yet have a portion of the apron lie within the hopper.

Figure 4:
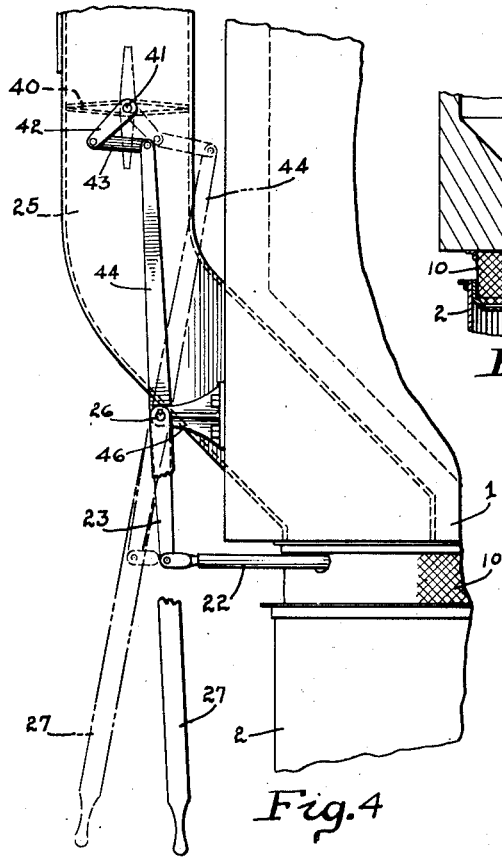
Figure 4 is a fragmentary side elevation of Figure 2 illustrating the valve control mechanism.
Figure 5:
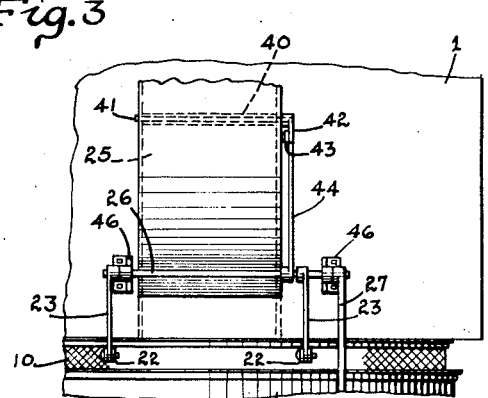
Figure 5 is a fragmentary side elevation viewing the left-hand side of Figure 4.

Any type of garner may, of course, be used and it may have in its bottom any number of delivery openings 15. In this instance, six such openings have been shown, see Figure 2. Valves of the usual kind may be used. In this instance two slide valves are used, each having three openings corresponding to openings arranged at each side of the vertical middle of the garner. The usual slanting sides 20 are provided for facilitating emptying of the garner. Referring to Figure 5: Each valve is connected by a suitable rod 22 to a crank arm 23, said crank arm being fixed on a shaft 26, which shaft is operated by a hand lever 27 (see Figures 1 and 4) accessible by the operator when in position to read the scale beam. The rods, of course, pass loosely through minimum sized openings of the curtain 10.

A pressure relief passage is indicated at 25 and communicates at its lower end as at 26 with the hopper and communicates at its upper end as at 28ᵃ with the interior of the garner, thus in this instance providing a relief passage which connects with both the garner and hopper. However, there is no intention to limit the invention in this regard inasmuch as the gist of the invention is the connection by which both valves can be simultaneously operated, or operated in such a manner as to insure sufficient pressure relief to avoid the hazards previously mentioned. The connection shown, however, is the usual connection. The flap valve previously used was generally placed at the upper end 28$^a$ of the relief passage to open outwardly into the garner.

At the top of the garner is an upwardly extending pipe through which the compressed air is vented, this pipe being indicated at 29, and located at the side of the garner opposite to the place of inlet of the compressed air. The pipe has the usual inspection trap 30 provided with a suitable slide-covered inspection opening generally indicated at 31. The trap is provided with the usual baffle 32, and the outer side of the trap leads into a suitable air relief pipe. The grain intake pipe for the garner is indicated at 35.

The important feature of this invention consists in the use of a valve 40 or its equivalent in a suitable relief passage 25 whatever the construction of the passage may be, or whatever its location. In this instance, an ordinary type of valve has been used and is mounted on a shaft 41 journaled in and extending through the sides of the tube 25. At the outside, the shaft has a crank 42, see Figures 4 and 5, which is connected by a link 43, see Figure 4, with an arm 44 rigid on shaft 26, see Figure 5. The shaft 26 is supported by suitable brackets 46 secured to the wall of the garner. As before stated, the object of the connection between the valves is to unfailingly sufficiently move the valve 40 when the delivery valve of the garner is opened. The object is to open the relief valve in a degree proportionate to the degree of opening of the supply valve and thereby unfailingly provide an escape for the displaced air to prevent puffing.

Figure 2:
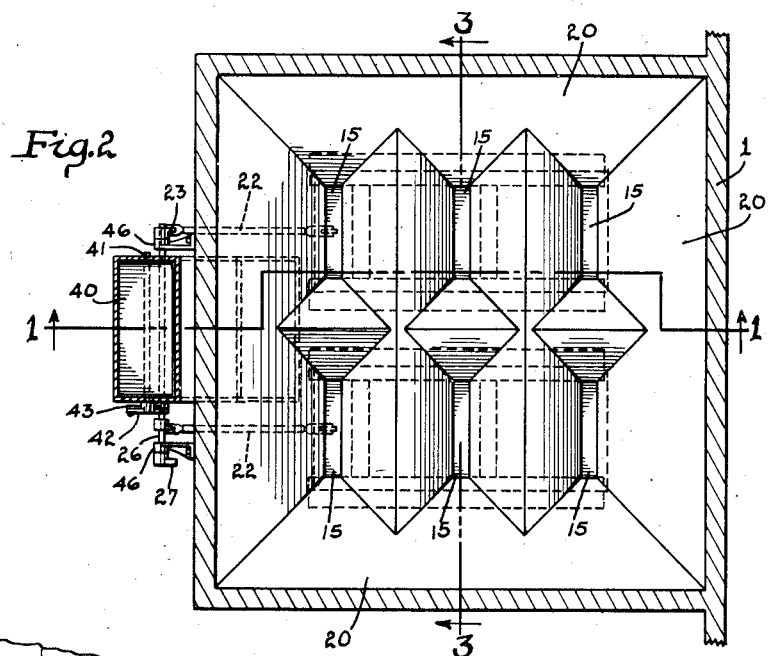
Figure 2 is a plan section through the garner taken on line 2—2 of Figure 1.
Figure 3:
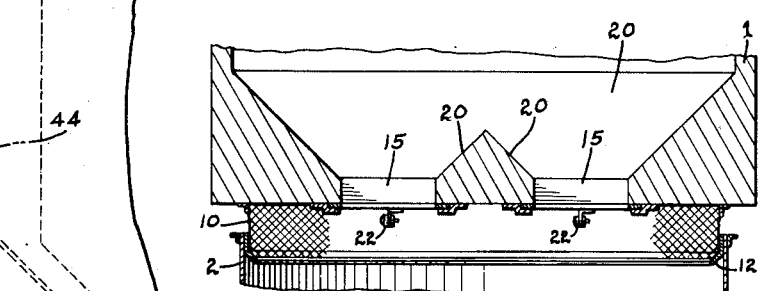
Figure 3 is a vertical section on line 3—3 of Figure 2.

In this instance, if the supply valves are only partly opened, the flow of the material from the garner to the hopper is not so rapid and therefore the displacement demand is not so great as when the supply valve or valves are fully opened, as shown in Figure 1. When these valves are fully open, the relief valve 40 is fully open, as shown in Figure 1 of the drawings. When the supply valve is fully closed, the relief valve is fully closed.

I claim as my invention:

1. In a grain weighing apparatus, the combination with a supply garner and a weighing hopper therefor, an air pressure relief passage for the hopper, a supply valve for controlling delivery of material from garner to hopper, a valve for said relief passage, and means controlling both valves to move the relief valve sufficiently to relieve the pressure of the displaced air when the supply valve moves to delivery position.

2. In a grain weighing apparatus, the combination with a supply garner and a weighing hopper therefor, an air pressure relief passage common to garner and hopper, a supply valve for controlling delivery of material from garner to hopper, a valve for said relief passage and means controlling both valves to move the relief valve sufficiently to relieve the pressure of the displaced air when the supply valve moves to delivery position.

3. In a grain weighing apparatus, the combination with a supply garner and a weighing hopper therefor, an air pressure relief passage for the hopper, provided by the garner, a supply valve for controlling delivery of material from garner to hopper, a valve for said relief passage, and means controlling both valves to move the relief valve sufficiently to relieve the pressure of the displaced air when the supply valve moves to delivery position.

4. In a grain weighing apparatus, the combination with a supply garner and a weighing hopper therefor, an air pressure relief passage for the hopper, a supply valve for controlling delivery of material from garner to hopper, a valve for said relief passage and means controlling both valves to open the relief valve sufficiently for pressure relief purposes when the delivery valve is opened.

5. In a grain weighing apparatus, the combination of a supply garner, a weighing hopper, an air vent passage communicating with the garner and the hopper, and valve means for garner and passage simultaneously movable in unison to open the passage and obtain discharge from garner to hopper.

LEO G. HAUK.